Oct. 26, 1926.
J. T. PATRY
1,604,302
MEANS FOR SECURING A SPROCKET WHEEL TO A MOWING MACHINE WHEEL
Filed Dec. 23, 1922
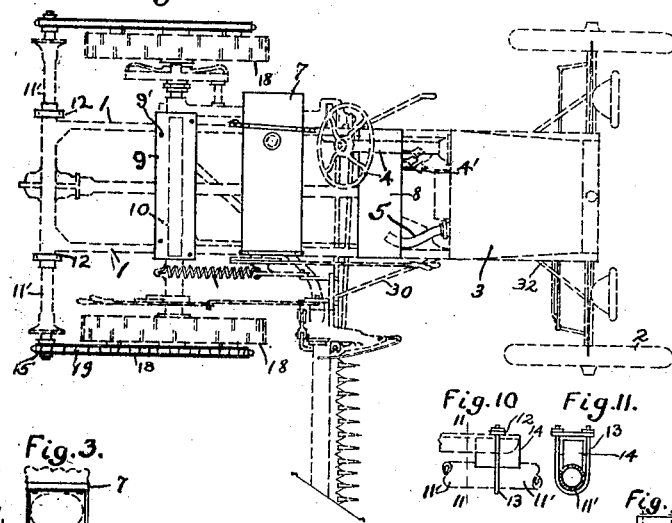
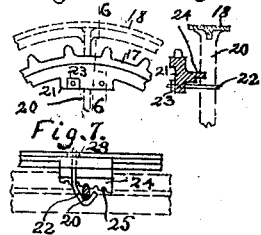
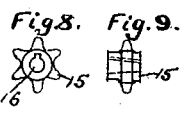
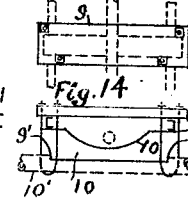
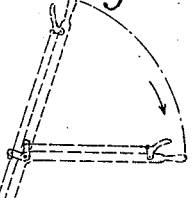
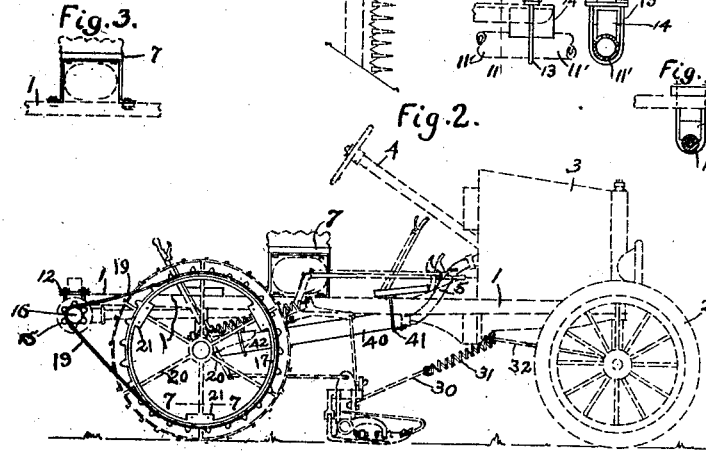
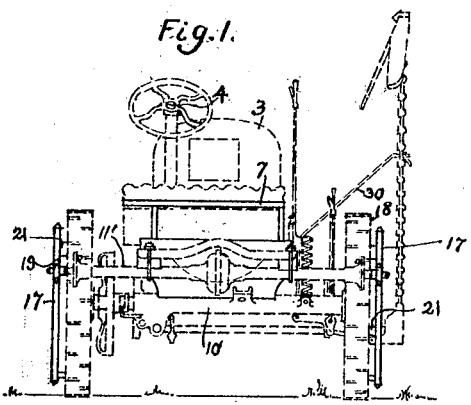
INVENTOR Joseph T. Patry
by S. W. Bates
Atty.

Patented Oct. 26, 1926.

1,604,302

UNITED STATES PATENT OFFICE.

JOSEPH THELESPHORE PATRY, OF LEWISTON, MAINE.

MEANS FOR SECURING A SPROCKET WHEEL TO A MOWING-MACHINE WHEEL.

Application filed December 23, 1922. Serial No. 608,754.

My invention relates to the combination of an automobile, and a mowing machine whereby the frame and actuating mechanism of the automobile is applied to the mowing machine so that the automobile takes the place of a pair of horses in operating the machine. All the controls in the automobile are left in their usual places; a seat is provided which rests directly on the frame of the automobile; the top is removed from the automobile including the seat and a temporary seat is provided resting directly on the frame. The tongue and seat of the mower are removed and the frame of the automobile brought to rest directly on the axle of the mowing machine and the rear end of the automobile frame is clamped firmly to the housing of the driving shaft of the automobile. Bearing blocks are provided to fill in between the mowing machine axle and the frame of the automobile with clamping rods to hold the parts together, the rear wheels of the automobile being removed and the sprocket pinion secured to the end of the wheel driving shaft. A sprocket gear is then secured to the outer surfaces of the mowing machine driving wheels and connected by means of sprocket chain with the sprocket pinion on the end of the automobile wheel driving shaft. Finally a stud is clamped to the under side of the frame and to the mowing machine body to hold the mowing machine and automobile against relative horizontal movement.

For the purpose of holding the cutter bar in right angular position with respect to the running mechanism, a spring tie rod connects the cutter bar at some intermediate point of its length with some fixed portion of the forward part of the auomobile.

Thus, to convert the mowing machine into a power-driven device, all that is required is to remove the pole and the seat from the mowing machine, substituting for the pole the stud pole and clamp to its wheels a special large sprocket gear; remove the two rear wheels from the automobile and secure a sprocket pinion to the end of the wheel driving shaft of the automobile; clamp the frame of the automobile by special clamps on the axle housing of the mowing machine, connect the sprocket pinion with the sprocket gear by a suitable sprocket chain, then apply the spring brace rod to the cutter bar, connecting it with the front end of the automobile and secure the seat to the automobile frame.

The combined machine is operated in every respect like an automobile; the cutter bar is to be operated exactly as if driven by horses and the machine is manipulated like an automobile.

In the accompanying drawing, I have shown the parts of a Ford automobile and a Deere mowing machine put together in operative position ready to be used as a power-driven mowing machine, the parts of the automobile and the parts of the mowing machine being both shown in dotted lines and the new connecting parts embodied in my invention being shown in full lines.

Fig. 1 is a rear elevation of the completed combination,

Fig. 2 is a side elevation of the same,

Fig. 3 is a side elevation of the seat showing its attachment to the frame,

Fig. 4 is a plan of the completed machine,

Fig. 5 is a side elevation of a portion of the mowing machine wheel with the sprocket wheel attached, Fig. 6 is a section on the line 6—6 of Fig. 5, Fig. 7 is a section on the line 7—7 of Fig. 2, Fig. 8 is an end elevation of the rear wheel shaft of the automobile with the sprocket pinion in position, Fig. 9 is a side elevation of said pinion, Fig. 10 is a rear elevation of the clamp connecting the end of the automobile frame with the housing of the automobile wheel shaft, Fig. 11 is a section on 11—11 of Fig. 10, Fig. 12 is a plan of the block connecting side rails of the frame with clamping nuts and bolts connecting frame with housing of mowing machine, Fig. 13 is an end elevation of the same with housing and shaft in section, Fig. 14 is a rear view of the same and, Fig. 15 is a side view of mowing machine lever for lifting the cutter bar to its riding position.

Referring to the drawing, 1 represents the side rails of the automobile frame, 2 are the front wheels, 3 is the hood, and 4 is the steering post.

The various control levers 4' are left in position; 5 represents the exhaust pipe, 32 is one of the brace rods or "wish bones" at the forward part of the automobile.

The machine is stripped of the top and all parts except the operating mechanism, steering wheel and the frame.

The automobile thus far dismantled is fitted to the mowing machine from which the tongue and regular seat have been removed. An operating seat 7 is secured to the side rails of the frame. Located on this seat, the operator is in position to handle the driving mechanism of the automobile as well as the various levers connected with the mowing machine.

A foot board 8 is also provided for supporting the feet of the operator and this is within easy reach by the foot of the foot levers 4' of the automobile. The frame of the automobile is clamped to the housing of the mowing machine axle by an elongated block 9 extending across from one side beam 1 to the other of the frame. This block 9 is fastened to the housing of the mowing machine axle by U-shaped clamping rods 9' which extend under the axle housing 10'. A bearing block 10 is inserted between the housing and the clamping block 9 so as to bring the frame in a substantially horizontal position.

It will be understood that bearing blocks of different widths will be required according to the make of the mowing machine and of the automobile.

The rear end of the frame 1 is clamped to the housing 11' of the automobile wheel shaft 16 by clamps 12 and U-shaped clamping rods 13 which pass beneath the housing 11' and are held in place by suitable nuts.

Bearing blocks 14 are interposed between the frame and the housing to support the housing in a position to drive the mowing machine.

It is necessary to so support the housing of the automobile driving shaft because the automobile is dismantled and the side springs removed when it is prepared for combination with the mowing machine. By means of the clamps above described, the wheel driving mechanism of the automobile is brought to be firmly and directly supported by the frame of the automobile and thus is able to exert the necessary force to drive the mowing machine.

Power is applied to the mowing machine by means of a sprocket pinion 15 which is secured to the outer end of the automobile wheel driving shaft 16, (Fig. 5). A sprocket gear 17 is clamped to the outside of the mowing machine wheel 18 having spokes 20 and is connected with the sprocket pinion 15 by a sprocket chain 19.

The clamping mechanism for clamping the sprocket gear 17 to the mowing machine wheel 18 consists of bolts which extend through the body of the sprocket wheel and hook around one or more of the spokes of the mowing machine 17. To enable this to be done, enlargements 21 are formed on the body of the gear and through these enlargements extend the hook bolts 22 tightened by suitable nuts 23.

There is also formed on the enlargement an inward projection or flange 24 which has formed along its inner edge a series of indentations or recesses 25 adapted to fit closely against the edge of the spoke 20.

The corrugations or indentations 25 along the edge of the projection 24 vary progressively in distance on the enlargement 21 from one end to the other, as shown in Fig. 7.

The purpose of making these recesses of varying distances from the face of the projection and of the gear is to bring the gear at varying distances from the center of the mowing machine wheel according to the thickness of the wheel on different machines and to bring the sprocket chain 19 beyond the outer rim of the wheel where it will have a clear space in which to run. The cutter bar on the regular mowing machine is held in position at right angles to the direction of travel by the stiffness of the body of the machine and the pole which is firmly held in place by the horses which draw the machine. When the machine is combined with the automobile, however, some special arrangement must be made for holding the cutter bar at right angles to the machine and for this purpose, I attach to the cutter bar at some intermediate point between its ends a spring brace rod 30, the forward end of which is hooked to some portion of forward end of the automobile, preferably, over the brace rod 32 or what is called the "wish bone."

The brace rod 30 has connected with it a spiral spring section 31, which being slightly stretchable, prevents any unusual strain being placed on the forward end of the automobile. To keep the mowing machine and the frame of the automobile rigidly in their relative positions horizontally, I insert a relatively short stud pole 40, the forward end being clamped to the under side of the frame 1 by suitable means, as the U-shaped bolts 41, while the rear end is secured to the body of the mowing machine by suitable bolts, 42.

The operation of the combination machine it is not necessary to describe. The automobile is driven in the usual way to take the place of a pair of horses and all the various operations are carried out in the usual manner.

It will be understood that a sprocket pinion is secured to each end of the two part driving shaft of the automobile, each connected by a sprocket chain to a sprocket wheel secured to a sprocket on the outside of each driving wheel of the mowing machine.

A mowing machine fitted up and combined with an automobile, particularly of the Ford type, can be quickly and easily shifted and readily manipulated in the mowing field, being even more easily handled than a pair of horses. Almost all farmers now have a Ford machine and if this machine can be utilized for doing farm work, much is added to its value to the farmer. As will be seen, the only special parts required are the sprocket pinion, sprocket gear with its clamping hooks designed to be clamped to three spokes of the mowing machine wheel, the U-shaped clamping rods for securing the rear of the frame to the housing of the main driving shaft, the U-shaped clamping bolts for securing the frame to the housing of the mowing machine axle, the stud pole and the special seat and foot board.

The parts are all cheaply made and can be easily applied to the various makes of mowing machines.

While I have described the automobile as a Ford, it is evident that any machine can be used for this combination.

I claim:—

In a combined automobile and mowing machine, a sprocket gear comprising a ring provided with sprocket teeth and having at intervals integral enlargements each provided at the inner side of the ring with a laterally extending lug tapered circumferentially of the ring and provided at the side edge with spoke engaging recesses located at different distances from the ring and a bolt passing through the said enlargement in spaced relation with the lug for engaging a spoke to secure the same in one of the recesses of the said lug and having means at its inner end for embracing the said spoke and provided at its outer end with a nut.

JOSEPH THELESPHORE PATRY.